United States Patent
Jahr

(10) Patent No.: US 10,542,091 B2
(45) Date of Patent: Jan. 21, 2020

(54) REPOSITORY-BASED SHIPMENT CHANNEL FOR CLOUD AND ON-PREMISE SOFTWARE

(71) Applicant: SAP SE, Walldorf (DE)

(72) Inventor: Andreas Jahr, Karlsruhe (DE)

(73) Assignee: SAP SE, Walldorf (DE)

( * ) Notice: Subject to any disclaimer, the term of this patent is extended or adjusted under 35 U.S.C. 154(b) by 184 days.

(21) Appl. No.: 15/812,248

(22) Filed: Nov. 14, 2017

(65) Prior Publication Data

US 2019/0149604 A1 May 16, 2019

(51) Int. Cl.
| | |
|---|---|
| G06F 21/33 | (2013.01) |
| G06F 21/62 | (2013.01) |
| H04L 29/08 | (2006.01) |
| H04L 9/32 | (2006.01) |
| G06F 8/60 | (2018.01) |
| G06F 16/955 | (2019.01) |
| G06F 21/42 | (2013.01) |

(52) U.S. Cl.
CPC ............ *H04L 67/1097* (2013.01); *G06F 8/60* (2013.01); *G06F 16/9566* (2019.01); *H04L 9/3263* (2013.01); *H04L 67/2819* (2013.01); *H04L 67/34* (2013.01); *H04L 2209/76* (2013.01)

(58) Field of Classification Search
None
See application file for complete search history.

(56) References Cited

U.S. PATENT DOCUMENTS

| | | | |
|---|---|---|---|
| 6,381,631 B1* | 4/2002 | van Hoff | H04L 63/0823 707/999.001 |
| 8,392,908 B2 | 3/2013 | Laicher et al. | |
| 8,671,392 B2 | 3/2014 | Jahr et al. | |
| 8,849,978 B1* | 9/2014 | Batson | H04L 67/10 709/223 |
| 9,026,502 B2 | 5/2015 | Driesen et al. | |
| 9,183,123 B2 | 11/2015 | Spektor et al. | |

(Continued)

OTHER PUBLICATIONS

A Framework for Live Software Upgrade. Yu et al. IEEE. (Year: 2002).*

(Continued)

*Primary Examiner* — Venkat Perungavoor
(74) *Attorney, Agent, or Firm* — Fish & Richardson P.C.

(57) ABSTRACT

Implementations of the present disclosure include methods, systems, and computer-readable storage mediums for receiving a request for at least one software artifact stored within a software repository of one or more software repositories of an enterprise, the request being received from a continuous delivery (CD) pipeline associated with an on-premise landscape of a customer, and including a user identifier, and at least one uniform resource locator (URL) indicating a location of a respective software artifact within the software repositories, providing, the request to a repository proxy of the enterprise, the repository proxy including a transparent, terminating network proxy, providing, by the repository proxy, an audit log entry associated with the request, the audit log entry being recorded in an audit log, and transmitting, by the repository proxy, a response to the request, the response including the software artifact retrieved from the software repositories based on the at least one URL.

20 Claims, 5 Drawing Sheets

(56) References Cited

U.S. PATENT DOCUMENTS

| | | | |
|---|---|---|---|
| 9,189,226 | B2 | 11/2015 | Driesen et al. |
| 9,195,453 | B1 | 11/2015 | Giammaria et al. |
| 9,276,825 | B2 | 3/2016 | Misovski et al. |
| 9,336,060 | B2 | 5/2016 | Nori et al. |
| 9,489,647 | B2 | 11/2016 | Martinez et al. |
| 9,639,448 | B2 | 5/2017 | Gebhard et al. |
| 9,678,740 | B2 | 6/2017 | Heine et al. |
| 9,722,890 | B2 | 8/2017 | Jahr et al. |
| 2008/0109801 | A1* | 5/2008 | Levine .................... G06F 8/65 717/171 |
| 2012/0054875 | A1* | 3/2012 | Antill ..................... G06F 8/65 726/28 |
| 2013/0159427 | A1 | 6/2013 | Jahr et al. |
| 2013/0191820 | A1 | 7/2013 | Jahr et al. |
| 2014/0379669 | A1 | 12/2014 | Driesen et al. |
| 2014/0380265 | A1 | 12/2014 | Driesen et al. |
| 2015/0100684 | A1 | 4/2015 | Maes et al. |
| 2015/0295844 | A1 | 10/2015 | Perreira et al. |
| 2016/0226992 | A1 | 8/2016 | Akcin |
| 2016/0241444 | A1 | 8/2016 | Maes |
| 2017/0061348 | A1 | 3/2017 | MacK et al. |
| 2017/0109137 | A1 | 4/2017 | Subramanian et al. |
| 2017/0109536 | A1 | 4/2017 | Stopel et al. |
| 2017/0115976 | A1 | 4/2017 | Mills |
| 2018/0121184 | A1* | 5/2018 | Tsai .................... G06F 9/45558 |
| 2018/0365131 | A1* | 12/2018 | Armitage ............ G06F 11/3676 |

OTHER PUBLICATIONS

Continuous Release and Upgrade of Component-Based Software. Storm. ACM. (Year: 2005).*

On the journey to continuous deployment: Technical and social challenges along the way. Claps et al. Elsevier. (Year: 2014).*

Skelton, Matthew et al., "Introduction to Continuous Delivery with Windows", Mar. 17, 2016; [Retrieved from Google Search Jun. 5, 2017] https://www.oreilly.com/ideas/introduction-to-continuous-delivery-with-windows; 11 pages.

Koenigsberg, Sheryl, "Delivering SaaS value with on-premises software", Mar. 6, 2015; [Retrieved from Google Search Jun. 5, 2017]; http://blog.infinio.com/delivering-saas-value-with-on-premises-software; 4 pages.

"CIOReview: 100 Most Promising Oracle Solution Providers 2016", [Retrieved from Google Search Jun. 6, 2017; https://www.rubiconred.com/category/myst/;_15 pages.

Schaeffer, Chuck, "DevOps Toolchain for Microsoft Dynamics 365"; [Retrieved from Google Search Jun. 8, 2017] http://www.crmsearch.com/devops-toolchain.php; 2 pages.

\* cited by examiner

REPOSITORY-BASED SHIPMENT CHANNEL FOR CLOUD AND ON-PREMISE SOFTWARE

BACKGROUND

Software applications can be provided as on-premise applications, or cloud-hosted applications. For example, a first version of an application can be provided as an on-premise application, and a second version of the application can be provided as a cloud-hosted application. In general, on-premise applications of an enterprise that are installed on, and executed using hardware operated by an enterprise. In contrast, cloud-hosted applications are installed on, and executed using hardware operated by a third-party cloud service provider.

Continuous delivery of software for both cloud-hosted, and on-premise deployments is problematic. For example, cloud-hosted software is delivered with continuous integration, and continuous delivery pipelines directly from software repositories without additional packing and production steps. This occurs with a relatively high frequency (e.g., daily). The same principle should be applied to on-premise deliveries of the same application. Also, on-premise deliveries must adhere to regulatory regimes (e.g., export control, embargo checks) on access to the software, while preserving the continuous delivery qualities to the cloud. Clients that process software artifacts during the lifecycle, and the software repositories providing these artifacts cannot be changed to facilitate on-premise consumption.

Continuous delivery (CD) infrastructures, and software repositories are often provided as third-party products, or open source tools. It can be costly, or even impossible to adapt these infrastructures and tools for specific on-premise delivery requirements, such as embargo checks, and/or license checks. This would require, for example, entanglement of several open source projects with a hurdle in convincing the community to adopt proposed changes, or fork the projects, and enhance them in an enterprise-proprietary manner. In addition, some entities do not support network proxies, such that one cannot easily intercept the traffic for access control or export audit logging.

Further, the technical product definition between on-premise, and cloud (i.e., the set of software repository URLs pointing to the software artifacts) should not vary between the cloud, and on-premise deliveries. For example, it is error-prone, and costly to change the product definition for the cloud, and the on-premise deliveries.

SUMMARY

Implementations of the present disclosure include computer-implemented methods for continuous delivery of a cloud-hosted version, and an on-premise version of an application.

In some implementations, actions include receiving a request for at least one software artifact stored within a software repository of one or more software repositories of an enterprise, the request being received from a continuous delivery (CD) pipeline associated with an on-premise landscape of a customer, and including a user identifier, and at least one uniform resource locator (URL) indicating a location of a respective software artifact within the software repositories, providing, the request to a repository proxy of the enterprise, the repository proxy including a transparent, terminating network proxy, providing, by the repository proxy, an audit log entry associated with the request, the audit log entry being recorded in an audit log, and transmitting, by the repository proxy, a response to the request, the response including the software artifact retrieved from the software repositories based on the at least one URL. Other implementations include corresponding systems, apparatus, and computer programs, configured to perform the actions of the methods, encoded on computer storage devices.

These and other implementations may each optionally include one or more of the following features: the request is provided through a secure channel, repository proxy decrypts the request using one or more repository certificates, and the repository proxy encrypts the response using the one or more repository certificates; the request is transmitted to the CD pipeline for delivery of the software artifact to the on-premise landscape; the repository proxy retrieves the software artifact from the software repository associated with the at least one URL; actions further include, prior to receiving the request, determining that a user associated with the user identifier is to be granted access to the software artifact stored in the software repository, and providing an entry in a repository access list, the entry indicating that the user is granted access to the at least one software artifact; the entry is provided based on a product-to-repository mapping, which maps software artifacts to respective URLs within the software repositories; the request is provided to a repository proxy in response to a router determining that the request has cleared an embargo check; and any legal check, and any license check are executed by a check service, and a registration service independent from access to a software repository.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
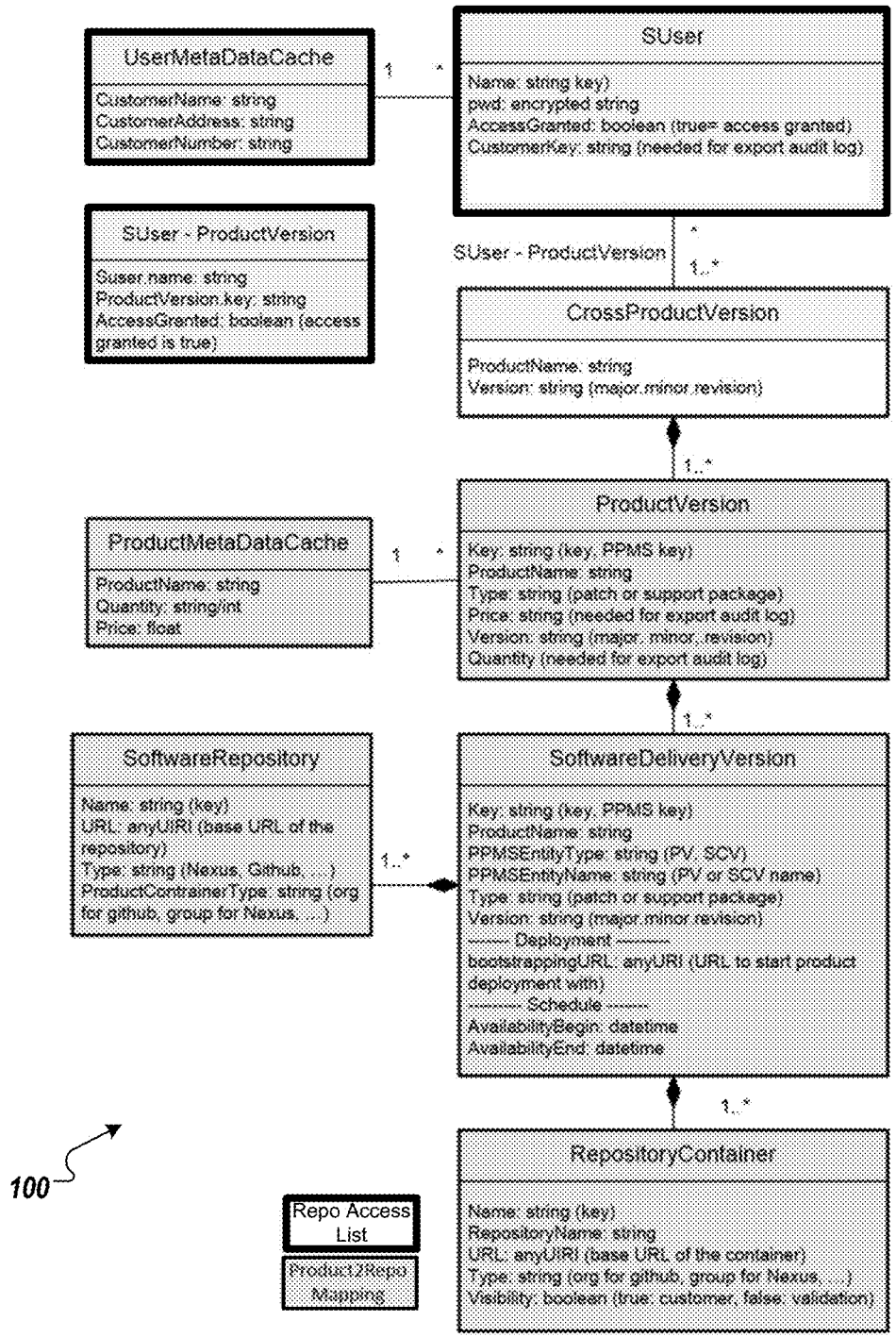
FIG. 1 depicts an example data model used to perform tasks in accordance with implementations of the present disclosure.

Implementations of the present disclosure include computer-implemented methods for cloud-hosted, and on-premise application deliveries. More particularly, implementations of the present disclosure are directed to providing a control adherent, and optimized solution for on-premise software delivery with a repository-based shipment channel. In some implementations, and as described in further detail herein, software consumption is divided into multiple, asynchronous processes including an access enablement process, and a software access process (downstream process). In some examples, the access enablement process checks permissions to access software using software license, export license, embargo lists, and the like, and grants permissions for requested software at software repositories. In some examples, the software access process exposes software repositories to continuous delivery pipelines, and deployment clients, logs technical access, merges access logs with customer and product data, and creates legally required export audit log. As described in further detail herein, implementations of the present disclosure use a transparent, terminating network proxy, referred to herein as a repository proxy, to enable logging of secure access to software repositories, and overcoming a lack of proxy support.

As introduced above, implementations of the present disclosure are generally directed to continuous integration and continuous delivery of commercial software to both cloud, and on-premise infrastructures. In some examples, continuous integration is a software development practice that requires developers to frequently (e.g., daily) integrate code into a shared repository, where each check-in is verified by an automated build. In some examples, continuous delivery can be described as providing changes (e.g., updates) to software on a relatively frequent basis (e.g., bi-weekly). More particularly, continuous delivery aims to produce software in short cycles, ensuring that the software can be reliably released at any time, with the aim of building, testing, and releasing software faster, and more frequently. This enables incremental updates to software applications that are in production. Continuous delivery has been described as enabling regular, rapid, reliable software releases in a pull-based approach (e.g., the software is "pulled" through a delivery mechanism when needed). This stands in contrast to typical software deployment, in which changes are included in patches, software upgrades, versions, and the like that are "pushed" out by the software developer (e.g., a push-based approach).

Continuous delivery is achieved using pipelines, each of which breaks the software delivery process into stages. Example stages include build automation and continuous integration; test automation; and deployment automation. Each stage validates the new functionality, and prevents errors from affecting users. In some examples, the build automation and continuous integration stage includes building binaries for deliverables that are passed to the subsequent stages. New or modified features introduced to the software are integrated into the central code base on a continuous basis, built, and tested. In the test automation stage, the to-be-delivered version of the application is tested to ensure that it meets requirements (e.g., functionality, security, performance, compliance. In the deployment automation stage, the new version of the application is deployed to production landscapes. The deployment is automated, and enables rapid delivery of new functionality (e.g., within minutes).

In some instances, cloud software can be delivered with continuous integration (CI), and continuous delivery (CD) pipelines directly from the software repositories without additional packing and production, and is done so at a relatively high frequency (e.g., daily). Cloud software delivery is performed using CI/CD tools (e.g., open source tools) that are generally operated within the same legal entity. That is, within one enterprise that is responsible, and software access is not subject to control checks (e.g., embargo, license). Any required checks and logging is done directly, and synchronously when accessing the software packages. On-premise software delivery, on the other hand, is done by taking the software artifacts from the software repositories, and by packing them into large archives. On-premise customers download the large packages, and special update and installation tools process the packages for deployment.

In view of the foregoing, implementations of the present disclosure provide a repository-based shipment channel for cloud-hosted, and on-premise application deliveries. More particularly, and as described in further detail herein, implementations of the present disclosure split application consumption into multiple asynchronous processes. In some examples, a first process includes an access enablement process, which provides initial and recurring checks as to whether a user has permission to access the software based on software license, export license, embargo lists, and the like. The first process selectively grants permissions for the requested software at respective software repositories. In some examples, a second process includes a downstream access process, which exposes the software repositories to continuous delivery (CD) pipelines and deployment clients, logs technical access, and merges an access log with customer and product data to provide, for example, export audit logs.

In accordance with implementations of the present disclosure, a transparent, terminating network proxy is used to enable logging of secure access to the software repositories, and overcoming the lack of proxy support. Further, a mapping (referred to herein as a product-to-repository (or product2repo) mapping) is provided between the technical level (e.g., user, product artifact URLs, software repositories), and business level (e.g., customer, product) in order to translate technical access to checks and access on the business level.

Implementations of the present disclosure are described in further detail herein with reference to products, services, and infrastructures provided by SAP SE of Walldorf, Germany. It is contemplated, however, that implementations of the present disclosure can be realized with any appropriate products, services, and/or infrastructures provided by one or more providers.

To provide further context for implementations of the present disclosure, an example shipment architecture can distinguish between upstream and downstream. In some examples, upstream includes production, validation, and publication of the software. Upstream includes the access and download of the published software by customers. Depending on the classification of the software (e.g., mobile, on-premise, cloud), different shipment channels are available that comply with relevant requirements (e.g., to legal, corporate), and grant users physical access to the software. In some examples, private cloud shipment is classified as commercial, non-customer specific, and on-premise.

In some examples, downstream implementation of private cloud shipment channels requires a user to log onto the infrastructure providing the software (e.g., the Software Download Center/SWDC in the Service Market Place/One Support Portal (SMP) provided by SAP SE). In this example, the logon already implies embargo checks (e.g., person, country), and license checks. For example, access to the product artifacts is only possible, if the user (or the customer that the user is an agent of) has licensed the product. The user is also only able to access artifacts for which the export control classification (ECCN) is appropriate. Consequently, the product artifact repository and the checks are tied together.

A non-limiting example private cloud shipment include the on-premise shipment of the HANA Cloud Platform (HCP) Industry Edition (a Cloud Foundry based product provided by SAP SE), which is delivered as public cloud services to enterprises. The example private cloud shipment architecture makes use of SWDC in SMP, which requires a dedicated, manual production process that aggregates the product artifacts from various internal repositories (e.g., Github, S3, Nexus) into a number of packages that are manually uploaded to SWDC, and then presented like any other on-premise software to the customer. On the upstream side, the customer must manually download the software, unpack it, and then run the deployment pipeline.

In some examples, the avoidance of a specific private cloud shipment is a key consideration to be able to ship on a relatively frequent basis (e.g., bi-weekly) in a continuous delivery mode in the sense that deployments are automated out of the same code base for private clouds, and enterprise-provided clouds. Ideally, the artifact repositories are both accessible by the customer and by the enterprise, sharing the same deployment pipeline executing the continuous delivery. Currently, the only seriously targeted solution to achieving this goal is the extension of the artifact repositories to include the required checks for on-premise shipments. Implementations of the present disclosure enable extensions of the artifact repositories to be avoided, while still enabling compliant exposure of the artifact repositories in shipment channels.

FIG. 1 depicts an example data model 100 used to perform tasks in accordance with implementations of the present disclosure. In some implementations, the data model 100 combines a user access list, and the product2repo mapping. More particularly, user data is provided in a repository access list, and software data is provided in a product-to-repository mapping (product2repo mapping), described in further detail herein. In the depicted example, support user (s-user) refers to a user (e.g., employee) of a customer consuming the software. In some implementations, one or more optimizations of the data model 100 are possible. For example, instead of modeling all associations for each new delivery (e.g., tree of crossproduct, product-version, SoftwareDeliveryVersion, and RepositoryContainer) with an explicit tree, the respective entities just define a start version, and only changes are added with a new start version explicitly to the tree.

Figure 2:
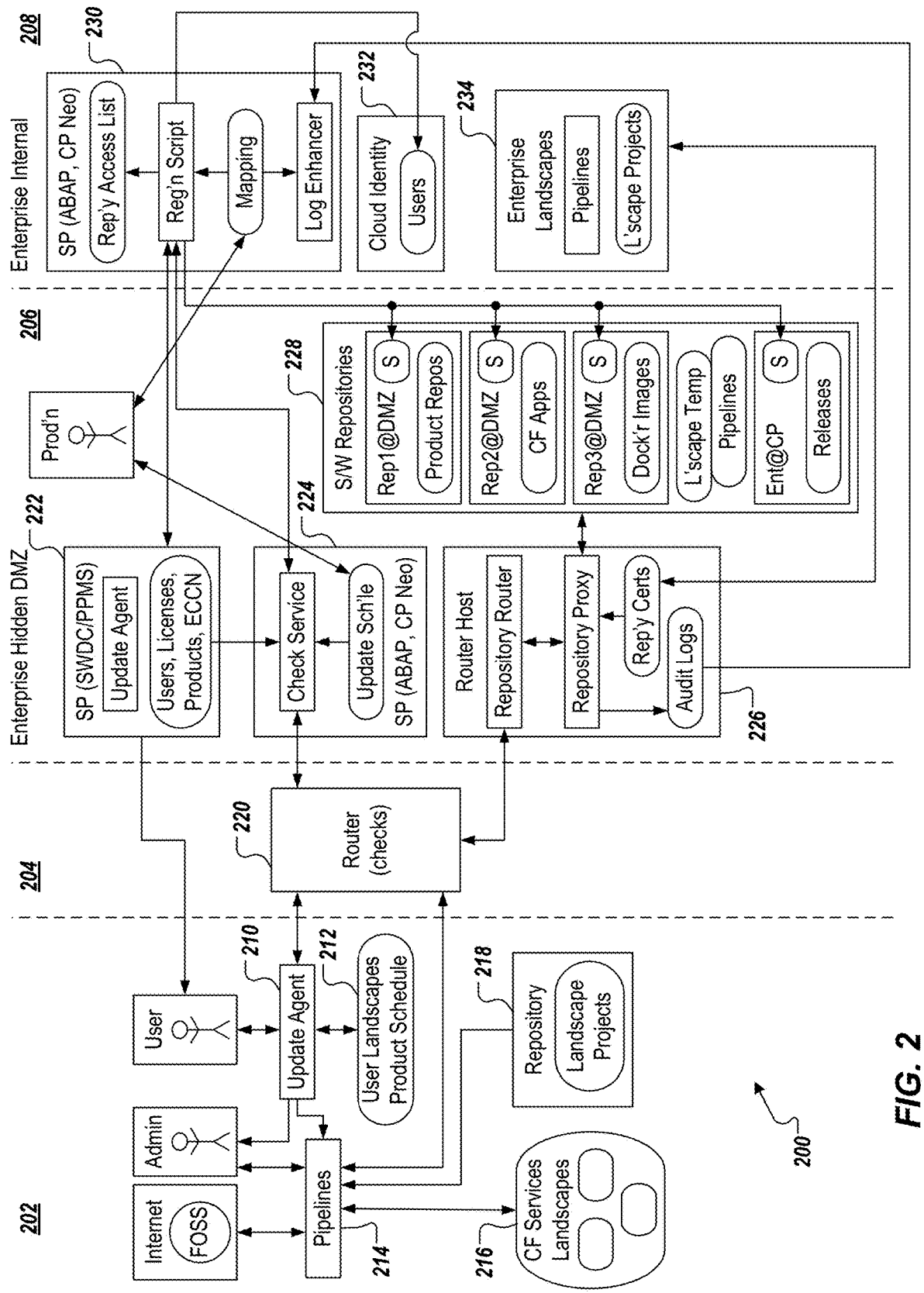
FIG. 2 depicts an example architecture in accordance with implementations of the present disclosure.

FIG. 2 depicts an example architecture 200 in accordance with implementations of the present disclosure. The example architecture 200 includes a service provider network 202, an enterprise demilitarized zone (DMZ) 204, an enterprise hidden DMZ 206, and an enterprise internal network 208. In some examples, the enterprise is the entity that is providing both the on-premise, and cloud versions of software applications.

In the depicted example, the service provider network 202 includes an update agent 210, a user landscapes and update schedule repository 212, one or more pipelines 214, service landscapes 216, and a landscape projects repository 218. The enterprise DMZ 204 includes a router 220, which performs any required checks (e.g., regulatory checks, such as embargos) based on the source IP addresses.

The enterprise hidden DMZ 206 includes a software marketplace (SMP) module 222 (e.g., including an enterprise-provided software download center (SWDC), and portfolio project management software (PPMS)), a grant access host module 224, a router host module 226, and a plurality of software repositories 228. The SMP module 222 includes an update agent, and a repository of users, licenses, products, ECCNs, and the like.

The grant access host module 224 includes a check service agent, and an update schedule. The update agent of the service provider network 202 communicates with the check service agent of the grant access host module 224 through the router 220 of the enterprise DMZ 204. In some examples, the check service agent manages the initial registration of user access to the software repositories for private cloud landscapes according to licensed products, ECCN, embargo status, and the like. In addition, the check service agent provides the update schedule in order to automate the deployment of updates through the pipelines. In some examples, the update agent manages and facilitates communication with a check service agent, discussed herein, and assists in managing the automation of updates through automation pipelines based on a schedule given by the enterprise.

The software repositories 228 (e.g., Nexus, Git) expose software artifacts of the enterprise-provided software for private cloud consumption. The software repositories 228 includes a landscape template, and pipelines. In some examples, the landscape template is a parameterized description of the updates required for the new (updated) version of the services landscape project (e.g., Cloud Foundry (CF) services landscape project). In some examples, the pipeline is a combination of CI content (e.g., Concourse), and the automation pipeline content for installation or update of a services landscape (e.g., a HCP CF services landscape).

The router host 226 includes a repository router, a repository proxy, repository certificates, and audit logs. In accordance with implementations of the present disclosure, the repository proxy is provided as a transparent, terminating reverse proxy, and communicates with the software repositories 228. In some examples, the repository proxy is provided as an nginx reverse proxy, or a mitmproxy reverse proxy. Implementations of the present disclosure provide stable, and customer-independent URLs to software repositories by using the repository proxy. In this manner, relatively frequent (e.g., bi-weekly) software delivery can avoid adjusting potentially hundreds of absolute URLs (pointing to repositories) spread over the entire shipped content for an internal version, and an external private-cloud version. In general, the repository proxy intercepts traffic (e.g., HTTPS traffic) for logging access to the software repositories for auditing purposes. The repository router communicates with the one or more pipelines 214 of the service provider network 202 through the router 220 of the enterprise DMZ 204. In some examples, the repository router is a software based router (e.g., iptables) that routes all incoming traffic targeting the software repositories to the repository proxy. The repository certificates are used by the repository proxy to terminate the HTTPS connection from the user on behalf of the software repositories.

The enterprise internal network 208 includes a registration module 230, a cloud identity module 232, and a landscapes module 234. In the depicted example, the registration module 230 includes a repository access list, a registration script, a mapping, and a log enhancer. In some examples, the registration script is a script that is called from the check service agent in order to create (or disable) user access to the software repositories for a specific product according to the product entry in the Product2Repo mapping, and logs the authorization state of the users to the repository access list. In some examples, the check service agent of the grant access host module 224 accesses the SMP module 222 to initially check whether the particular user can be granted access. In some examples, the registration service also accesses the SMP module 222 on a recurring basis to check whether the granted access is still valid. In some examples, the registration services accesses access the software repositories 228 to enter the user credentials in order to set the authorizations for the particular user. In some examples, the mapping of the registration module 230 includes the product2repo mapping described herein. The cloud identity module 232 includes a repository of users (e.g., registered users), which is referenced by the registration script of the registration module 230. The software repositories 228 communicate with the cloud identity module 232. The landscapes module 234 includes one or more pipelines, and a repository of landscape projects.

Implementations of the present disclosure are described in further detail with reference to the example architecture 200. The example architecture 200 is provided for automation in order to meet bi-weekly (or more frequent) updates. In accordance with implementations of the present disclosure, instead of extending all repositories for the required checks (e.g., legal, license, embargo, etc.) with each request, combinations of different measures ensure that access to the software is checked, and logged according to the rules of a respective channel. For example, country embargo checks, and logging for auditing purposes occurs at network level. License, ECCN, and SPL checks are carried out initially with distributing authorizations to the repositories for the licensed products and the user. If the license or user status changes (e.g. a user is now on the SPL), access to the software is timely revoked by changing the authorization of the software repositories bearing the product artifacts for downstream consumption (i.e., download). Due to this separation, the access to the software repositories is also possible from within the enterprise.

The example architecture 200 depicts a relatively large degree of automation. Rather than describing the example architecture 200 in further detail on a component basis, it is described along the processes it implements. Example processes include: onboarding a customer providing CF services landscapes, revoking customer access (e.g. due to embargo checks), access software repositories, processing an individual repository request, production of a new product version, and updating public cloud landscapes. The processes will be described in two implementations: full automation, and manual activities.

In general, the deployment process for one landscape includes multiple steps. An example first step includes checking, and preparing for necessary updates of the landscape project based on the product version (e.g., adding new users or parameters that are customer specific, implementing changed or new OpenStack or hardware requirements). An example second step includes the actual deployment of the landscape that can only be triggered when the first step has been marked as completed. This two-step notion is independent of the shipment channel, and only a concern for the private cloud shipment scenario.

With regard to the process for onboarding a customer, the example scenario includes a customer (e.g., customer enterprise) having licensed a private cloud product from the enterprise providing the software. The license is already available at the respective PPMS product, and the customer has a user (e.g., employee user accessing the software). In one step, the customer downloads an update agent. More particularly, the customer logs onto the SMP, and downloads and initializes the update agent, and configures the credentials (e.g., username, password) to be used for software repository access. The customer also configures the product and downloaded schedule location, and the landscape that is to be updated, or installed. Another step includes logging onto the check service. If automated, the customer starts the configured update agent that connects to the check service. If manual, during the licensing/purchase process, at least one customer user is known to the enterprise.

Another step includes preparing customer access to the software repositories. If automated, the check service checks whether the user has a license for the product, as well as whether the user is on an embargo list, for example. The user, the product, and the result of the check are entered to the repository access list that keeps track of users having access to the repositories. After a successful check (e.g., it is determined that there is no embargo preventing user access), the check service invokes the registration scripts for the s-user. If manual, the information is sent through a separate channel (e.g., email, telephone), and a password is generated by the enterprise, and is conveyed to the customer. The checks can be done manually as well as filling the repository access list. The registration script can be executed manually.

Another step includes execution of the registration script, in which the registration script receives an identifier assigned to the user (e.g., username), password, and licensed product. The registration script looks up the required repositories (and paths) in the product2repo mapping, and adds the user and password with corresponding read access rights to the software repositories. If roles are needed, the mapping would also exhibit the required roles. Now, the customer has access to the software repositories.

In some implementations, the order of the above-described onboarding process can be reversed. For example, first log onto the check service, and then retrieve and configure the update agent. The check service could already generate a customer specific update agent configuration script based on manual entries to the check service. If the order is reversed, the update agent could also be provided in one of the software repositories, and not the SMP since the check service would have already initiated the registration script, and thus access to the software repositories bearing the agent is already given.

With regard to the process for revoking customer access, if a user (or company) is set on the sanctioned party list (SPL), the enterprise may be obliged to timely disable access to software repositories by this person. The same is true, if the license expires. This can be referred to as an access revocation event, or short revocation event. One step can include centrally revoking the license, or restricting the user. In some examples, the enterprise indicates (e.g., in SMP, or PPMS) the license revocation, or the revocation of access rights to a user, which is the manifestation of the revocation event. The revocation event is detected. If automated, the registration service is called by SMP on this event in order to adjust the status of the repository access list. An alternative can include providing change event lists on a recurring basis (e.g., hourly) that are then compared to the repository access list. Such a measure would decrease the overall data processing, and still keep a timely realization of access revocation. If manual, the person who executes the revocation either changes the status of the repository access list directly, or informs the responsible user to do so. Finally, access is revoked. If automated, and the check of the repository access list is positive (i.e., determined that access is to be revoked), the revocation service invokes the registration script to either completely remove the user, or disable the user such that no further access to the repositories for this user is possible. If manual, the administration user is informed by the person revoking the license, or the changing the SPL about which user shall be blocked, and executes the registration script to remove the user (or disable the user).

With regard to the software access process, it can be noted that this process does not impact the shipment channel as it is only relevant for how private cloud shipments should be handled. The shipment channel relevant description is provided below. In one step, the update schedule is determined. If automated, the upgrade agent periodically connects (e.g., once a day) to the check service with a request for the update schedule. The check service returns the current schedule. The update agent informs the user (e.g., by email) about the update schedule. In some examples, the update schedule assumes a two-landscape-type set up: landscapes of type staging, and landscapes of type production. The update schedule foresees that first staging landscapes are being handled, and sometime later, production landscapes follow. In some examples, the update agent can be provided as a singleton in the provider landscape (i.e., serving all CF services landscapes). If manual, the customer receives a message (e.g., an email) that an update is available. The update schedule also includes the target product version (possibly as exact locations of the product updates) in order to find the right pipelines for the update/installation.

In another step, the landscapes are prepared. In some examples, updates may be required, which can include preparations by the customer, such as adding hardware, updating OpenStack, configurations, add passwords for new users as mandated by the landscape template, and the like. If automated, the update agent retrieves the preparation pipeline, landscape template, and preparation guide from the repository. The update agent informs the user (e.g., by email) that preparation can start. The customer is able to adjust the schedule according to its roll-out scheme. In some examples, only postponements are possible, but cannot drop from the scheduled (e.g., bi-weekly) updates. For example, skipping an update is not possible. If manual, the user downloads the preparation pipeline landscape template, and preparation guide, and downloads the update/installation pipeline. The actual download happens by means of cURL or other HTTP(S) clients based on instructions or HTTP message templates given by the enterprise. The user follows the preparation guide and starts the preparation pipeline in order to update the landscape infrastructure and the landscape project according to the pre-requisites described in the guide. The successful status of the preparation is persisted by the pipeline, and made available to the update agent. The preparation pipeline retrieves the update/installation pipeline. The automation pipeline is robust enough to deal with connectivity outages (due to revocation events or shaky network connections).

In another step, the landscape is updated/installed. If automated, the preparation pipeline starts the update/installation pipeline. If manual, the customer starts the update/installation pipeline. The pipeline initiates the update or installation process, and either directly downloads all needed artifacts from the enterprise repositories, or the downloaded content provides the URLs to further needed artifacts.

In some implementations, individual requests can be submitted to the software repositories. Such requests include credentials (e.g., username, password), which can be used to limit the access to licensed products. With regard to other checks, such as the embargo country check, the repository request enters the enterprise network, and the router performs the check based on the source IP address. If all checks are clear, access is granted, and is logged. Logging of the access (e.g., who, when, under which ECCN license) is one of the shipment channel requirements. For this purpose, the enterprise routers route the incoming traffic to the repositories to the router host, on which a terminating, transparent HTTPS reverse proxy is running. In some examples, the repository router routes the incoming request as TCP traffic targeting the software repositories to the repository (transparent) proxy.

In accordance with implementations of the present disclosure, the repository proxy is configured with enterprise certificates that represent the software repositories HTTP servers. In some examples, the certificates are issued on the IP addresses, or hostname of the repository (CN, Common Name), and SNI (Server Name Indication). The repository proxy detects any HTTP request (including HTTPS; TLS-specific requests), and intercepts the request instead of routing the request directly to the repository server. Any non-HTTPS requests are ignored. After intercepting the request, the repository proxy terminates the TLS connection from the client, connects to the repository server (with HTTPS), and responds to the client with its matching repository certificate. In effect, from a TLS perspective, the client appears to negotiate with the repository server, but actually communicates with the repository proxy. In turn, from the perspective of the repository server, the server appears to have a TLS connection with the client, but only has a connection to the repository proxy. This is possible, because the repository proxy impersonates the identity of the repository server at the TLS level using the local certificates.

With the interception and the HTTPS decryption at the repository proxy, it is now possible to log the access to the repositories (e.g., username, URL, timestamp). The valid ECCN license can be determined by the already existing URL to product mapping by having a separate asynchronous process matching the log entries to the products (for which the ECCN license is known).

Once the request reaches the software repository, the software repository checks whether the user is authorized to access the artifact defined in the request. The request is processed by the software repository, and the response is returned to the client through the transparent repository proxy.

In an upstream process, the customer accesses, and downloads published software. Beyond a traditional upstream process, implementations of the present disclosure provide additional artifacts including, for example, pipelines, mappings, and update agents, as described herein. In some implementations, validation is carried out on the codebase provided into the enterprise staging landscape. Installation and update validation for private cloud software is done by creating and updating validation landscape along the described processes. Private cloud validation will be done in specific landscapes before the customer facing software repositories are updated with new content. A new product version that is under validation is kept in the same repository as the software shipped to customers, but in a new branch or otherwise distinguishable. Customer access to the new version is only given once the new version has been validated, and an explicit release decision has been taken at the respective quality gate. Only then the registration script runs over the user base, and enables all authorized customers to access the new product version.

With regard to updating public cloud landscapes, the ultimate goal is also that all other public cloud landscapes (e.g., CF service landscapes) share the same processes. Consequently, public cloud landscapes are provided with the shipment channel of the present disclosure, and only the development and staging landscape will be handled specially, as they are used to produce the to-be-shipped software artifacts. It can be noted that the software repositories can be directly accessed from the internal enterprise network (e.g., avoiding the repository router. Eventually, no embargo or ECCN checks are required on accessing the product artifacts in the software repositories. For security reasons, a split between customer exposed software repositories, and the repository bearing the enterprise's public cloud landscape projects is mandatory. The reason is that sensitive information like passwords are kept in the landscape projects that must not be put at risk of being compromised, which would be the case if placed in the DMZ.

Implementations of the present disclosure provide multiple processes, and respective tasks. Example processes include an access enablement process, and a software access (production) process.

Figure 3:
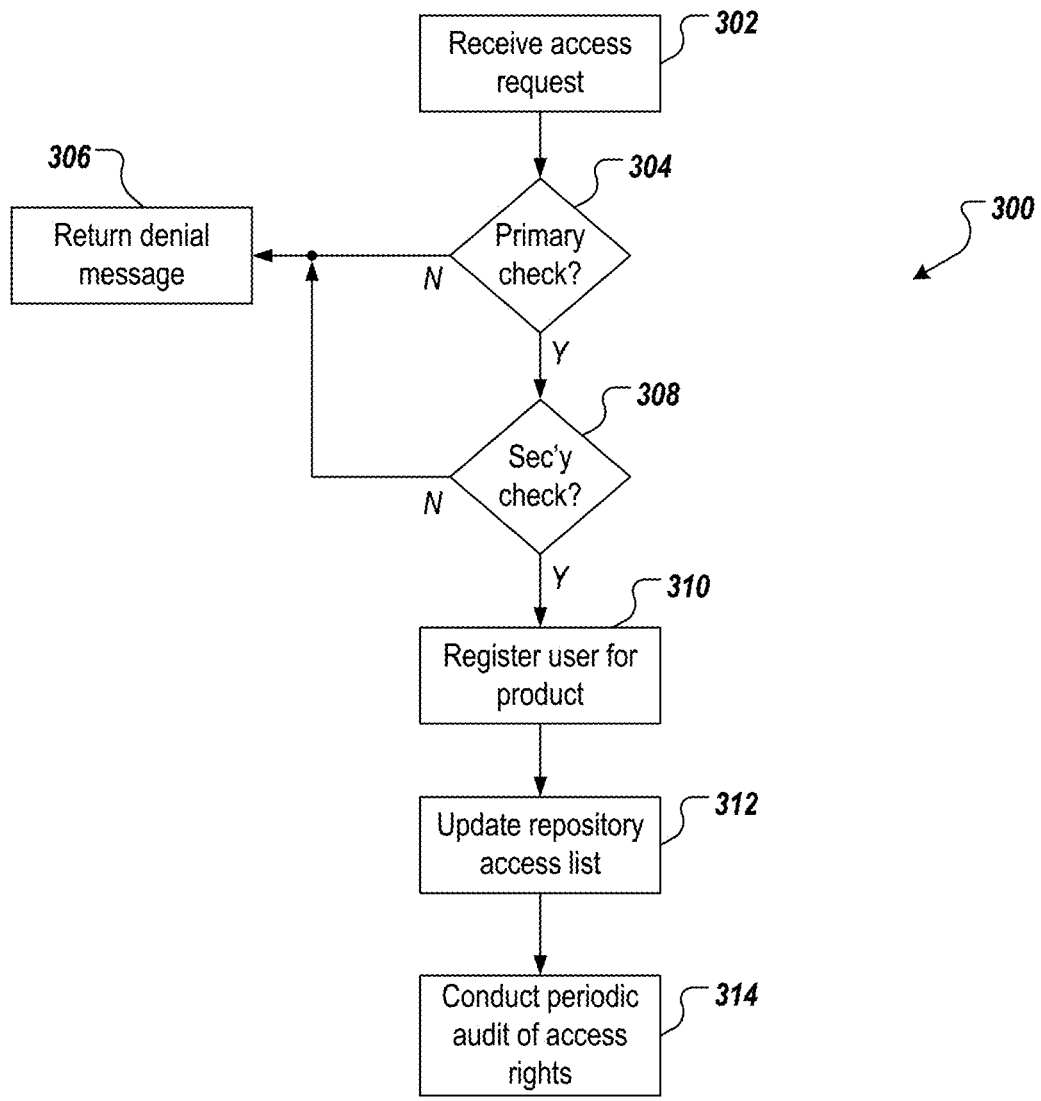
FIG. 3 depicts an example process that can be executed in accordance with implementations of the present disclosure.

FIG. 3 depicts an example process 300 that can be executed in accordance with implementations of the present disclosure. In some implementations, the example process 300 may be performed using one or more computer-executable programs executed using one or more computing devices. The example process 300 depicts access enablement in accordance with implementations of the present disclosure.

A request for access to software is received (302). For example, and with reference to the example architecture of FIG. 2, the router 220 receives the request from the update agent 210 of the customer requesting access. In some examples, the request indicates the software product (e.g., unique identifier assigned to the software product), and the user (e.g., unique identifier assigned to the user) requesting access. It is determined whether a primary check is met (304). In some examples, the primary check includes an embargo check (e.g., whether the request is originating from an embargoed entity (e.g., country). In some examples, the router 220 compares an IP address associated with the request to a list of embargoed entities (e.g., countries). If the IP address corresponds to an embargoed entity, the request is denied, and a denial message is returned (306). If the IP address does not correspond to an embargoed entity, the request is provided for one or more secondary checks (308). Example secondary checks includes checking whether the particular user has access rights, whether the appropriate license is in place, and whether export controls are satisfied (e.g., based on ECCN). In some examples, the check service agent of the grant access host module 224 queries the SMP module 222 to determine whether the one or more secondary checks are met. If any of the one or more secondary checks are is not met, the request is denied, and a denial message is returned (306).

If the one or more secondary checks are met, the user is registered for access to the software product (310). For example, the check service agent of the grant access host module 224 calls the registration script of the registration module 230, and provides a product identifier, and a user identifier. In some examples, the registration script determines one or more locations of the software product within the software repositories 228 by referencing the mapping (e.g., the product2repo mapping). For example, binaries of a software product can be in a single repository, or split between multiple repositories. The mapping of the registration module 230 provides one or more URLs, each URL indicating a location of a respective binary of the software product within the software repositories 228. The repository access list is updated (312). For example, the repository access list of the registration module 230 is updated to indicate that the user has access to the software product at the determined URL(s).

Periodic audit of access rights is conducted (314). For example, the registration script periodically audits the repository access list to determine whether the repository access list should be updated in view of any revoked access grants. In some examples, if the user subsequently loses access rights (e.g., license to product expires), the repository access list can be updated to remove the user from the repository access list for the particular product. Example periods for the audit can include, without limitation, hourly, every 6 hours, every 12 hours, daily, weekly, monthly, and the like. In some examples, the audit includes the registration script querying the SMP module 222 to confirm the accuracy of the repository access list with access information maintained by the SMP module 222 (e.g., compares each user-product authorization in the repository list to access information of the SMP module 222). The SMP module 222 can conduct the secondary checks to determine each is still valid.

Figure 4:
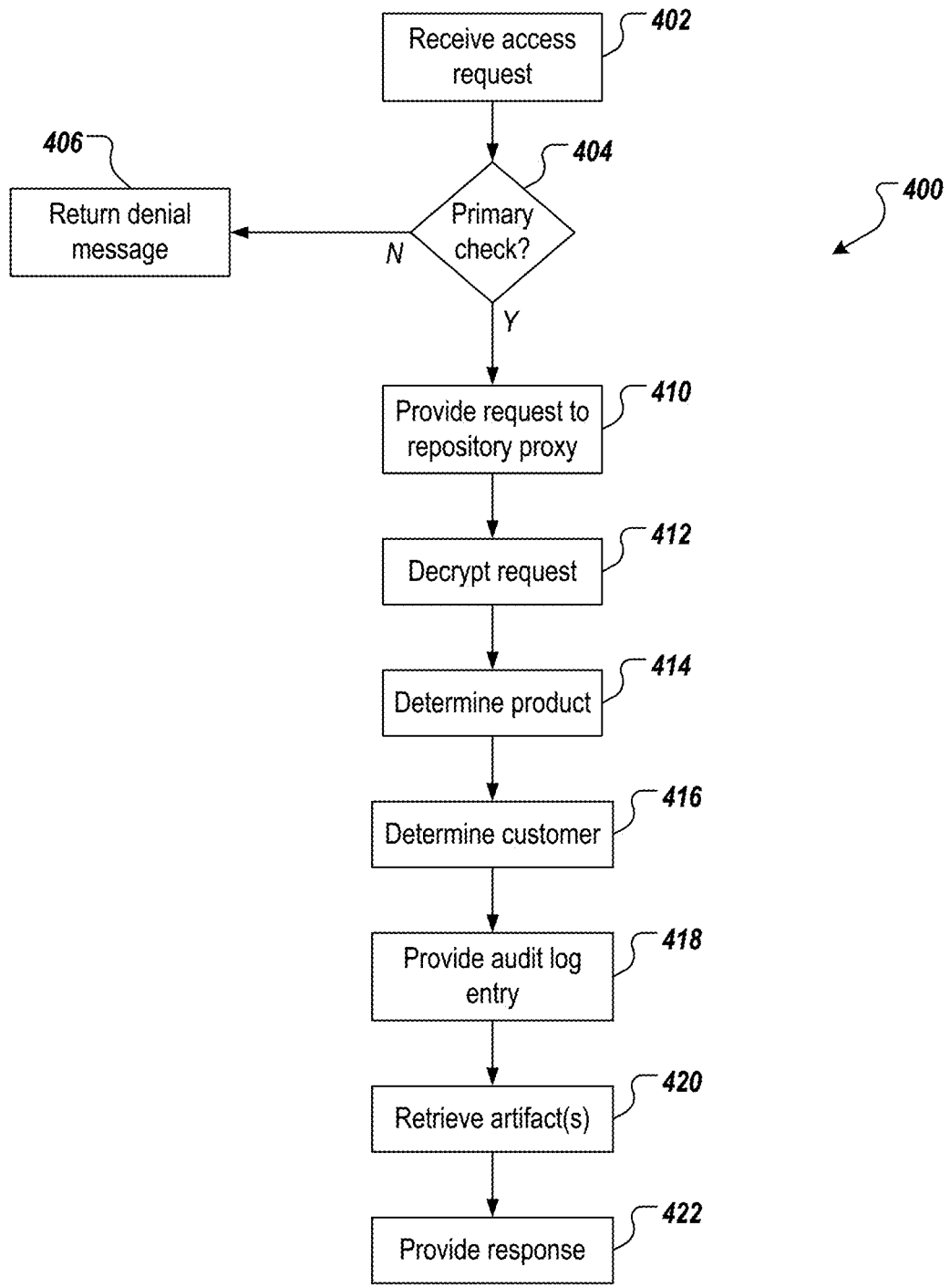
FIG. 4 depicts an example process that can be executed in accordance with implementations of the present disclosure.

FIG. 4 depicts an example process 400 that can be executed in accordance with implementations of the present disclosure. In some implementations, the example process 400 may be performed using one or more computer-executable programs executed using one or more computing devices. The example process 400 depicts software access (production use of the software) in accordance with implementations of the present disclosure. For example, the example process 400 depicts customer access to software after the customer (e.g., a user of the customer) has been granted access to the software (e.g., as described above with reference to FIG. 3).

A request is received (402). For example, and with reference to FIG. 2, a user submits a request to download software through the update agent 210, the request being transmitted to the router 220 through a pipeline 214. In some examples, the pipeline 214 is established based on user credentials, and artifact URLs, and periodically transmits requests (e.g., bi-weekly) for software updates to deliver to relevant landscapes. In some examples, the request is provided as an HTTPS GET request. In some examples, the request indicates one or more URLs for a software product (e.g., URLs of software repositories 228), and the user (e.g., unique identifier assigned to the user) requesting access. It is determined whether a primary check is met (404). In some examples, the primary check includes an embargo check (e.g., whether the request is originating from an embargoed entity (e.g., country). In some examples, the router 220 compares an IP address associated with the request to a list of embargoed entities (e.g., countries). If the IP address corresponds to an embargoed entity, the request is denied, and a denial message is returned (406).

If the IP address does not correspond to an embargoed entity, the request is provided to the repository proxy (408). For example, the request is forwarded to the repository router of the router host 226, which provides the request to the repository proxy. The request is decrypted (412). For example, the repository proxy decrypts the request using the repository certificates. The product is determined (414), and the customer is determined (416). For example, the user identifier (decrypted from the request) is used to determine which customer the user is associated with (e.g., is an agent/employee of) by cross-referencing the user with the repository access list. The one or more URLs (decrypted from the request) are used to determine which product the requested artifacts are associated with by cross-referencing the URL(s) with the product2repo mapping. An audit log entry is provided (418). For example, the audit log entry includes the user, the one or more URLs, the timestamp, the product, and the customer. In some examples, audit log entries are periodically added to the audit log (e.g., daily).

One or more software artifacts are retrieved (420), and a response is provided (422). For example, the software artifacts located at the one or more URLs are provided from respective software repositories 228. In some examples, the response is encrypted using the repository certificates, and includes the software artifact(s). The response is provided back to the pipeline 214 through the router 220, the pipeline delivering the software artifacts to the relevant landscapes. In accordance with implementations of the present disclosure, any request to access a software repository 228 requires credentials (e.g., username, password) to be provided. These credentials were created during the grant access process (e.g., the example process 300 of FIG. 3) by the registration script in each of the software repositories 228, in which the requested product resides, as well as adding the authorizations for the user for the parts/paths inside the software repository 228, in which the product resides. Consequently, the repository access to retrieve the one or more software artifacts means that the request not only contains the requested artifact URL, but also credentials that are checked by the software repository. Only with a valid user and appropriate authorizations, the request response contains the requested software artifact, otherwise access is denied.

Figure 5:
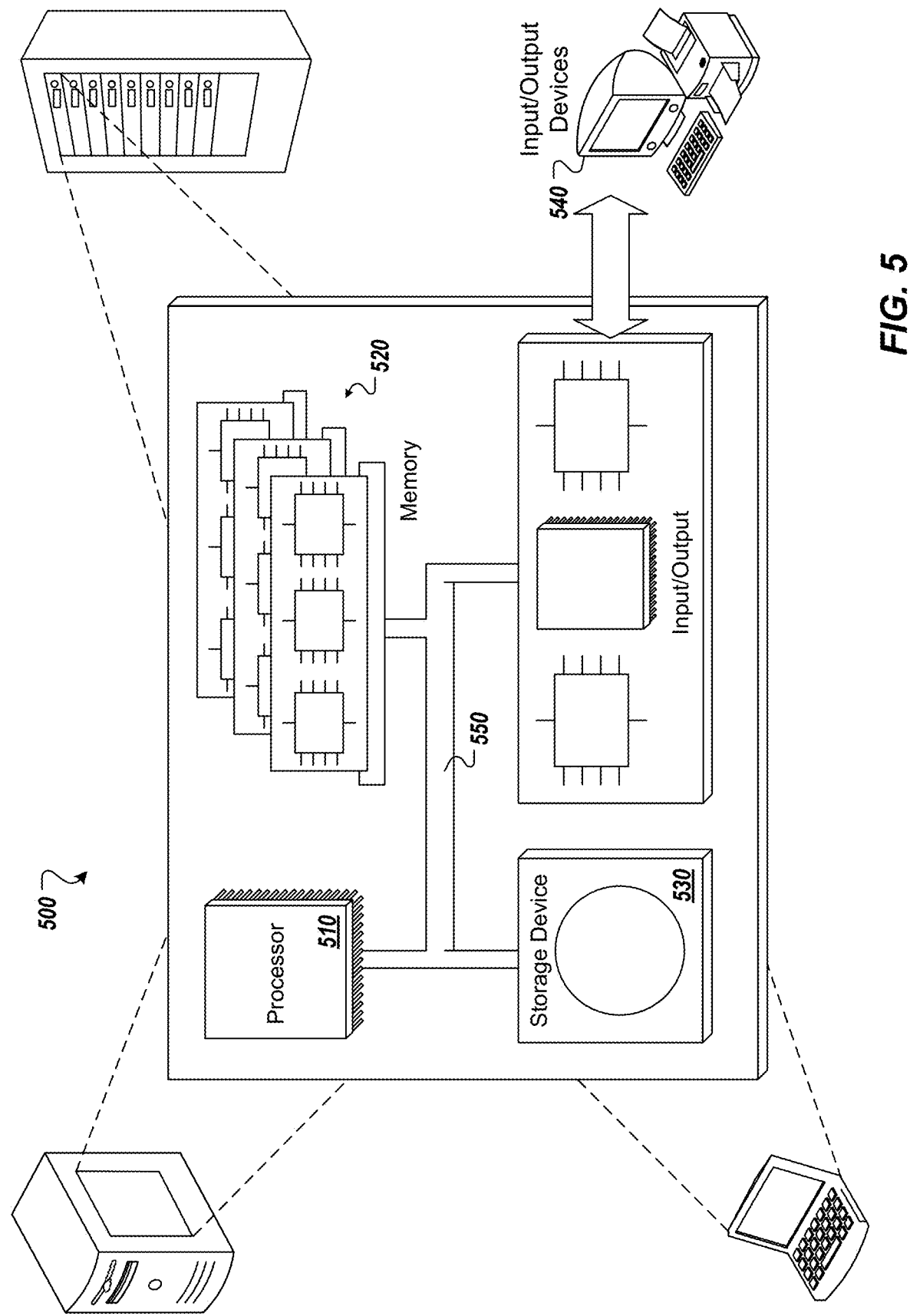
FIG. 5 is a schematic illustration of example computer systems that can be used to execute implementations of the present disclosure.

FIG. 5 depicts a schematic diagram of an example computing system 500. The system 500 may be used to perform the operations described with regard to one or more implementations of the present disclosure. For example, the system 500 may be included in any or all of the server components, or other computing device(s), discussed herein. The system 500 may include one or more processors 510, one or more memories 520, one or more storage devices 530, and one or more input/output (I/O) devices 540. The components 510, 520, 530, 540 may be interconnected using a system bus 550.

The processor 510 may be configured to execute instructions within the system 500. The processor 510 may include a single-threaded processor or a multi-threaded processor. The processor 510 may be configured to execute or otherwise process instructions stored in one or both of the memory 520 or the storage device 530. Execution of the instruction(s) may cause graphical information to be displayed or otherwise presented via a user interface on the I/O device 540.

The memory 520 may store information within the system 500. In some implementations, the memory 520 is a computer-readable medium. In some implementations, the memory 520 may include one or more volatile memory units. In some implementations, the memory 520 may include one or more non-volatile memory units.

The storage device 530 may be configured to provide mass storage for the system 500. In some implementations, the storage device 530 is a computer-readable medium. The storage device 530 may include a floppy disk device, a hard disk device, an optical disk device, a tape device, or other type of storage device. The I/O device 540 may provide I/O operations for the system 500. In some implementations, the I/O device 540 may include a keyboard, a pointing device, or other devices for data input. In some implementations, the I/O device 540 may include output devices such as a display unit for displaying graphical user interfaces or other types of user interfaces.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors for continuous delivery of software in on-premise landscapes, the method comprising:
   receiving, by the one or more processors, a request for at least one software artifact stored within a software repository of one or more software repositories of an enterprise, the request being received from a client through a continuous delivery (CD) pipeline associated with an on-premise landscape of a customer, and comprising a user identifier, and at least one uniform resource locator (URL) indicating a location of a respective software artifact within the software repositories;
   processing the request by a repository proxy of the enterprise, the repository proxy comprising a transparent, terminating network proxy, the repository proxy configured with enterprise certificates that represent servers of the one or more software repositories, the repository proxy terminating a secure connection from the client, and responding to the client with a matching repository certificate;
   providing, by the repository proxy, an audit log entry associated with the request, the audit log entry being recorded in an audit log; and
   transmitting, by the repository proxy, a response to the request, the response comprising the software artifact retrieved from the software repositories based on the at least one URL.

2. The method of claim 1, wherein the request is provided through a secure channel, repository proxy decrypts the request using one or more repository certificates, and the repository proxy encrypts the response using the one or more repository certificates.

3. The method of claim 1, wherein the request is transmitted to the CD pipeline for delivery of the software artifact to the on-premise landscape.

4. The method of claim 1, wherein the repository proxy retrieves the software artifact from the software repository associated with the at least one URL.

5. The method of claim 1, further comprising, prior to receiving the request:
   determining that a user associated with the user identifier is to be granted access to the software artifact stored in the software repository; and
   providing an entry in a repository access list, the entry indicating that the user is granted access to the at least one software artifact.

6. The method of claim 5, wherein the entry is provided based on a product-to-repository mapping, which maps software artifacts to respective URLs within the software repositories.

7. The method of claim 1, wherein the request is provided to a repository proxy in response to a router determining that the request has cleared an embargo check.

8. The method of claim 1, wherein any legal check, and any license check are executed by a check service, and a registration service independent from access to a software repository.

9. A non-transitory computer-readable storage medium coupled to one or more processors and having instructions stored thereon which, when executed by the one or more processors, cause the one or more processors to perform operations for continuous delivery of software in on-premise landscapes, the operations comprising:
   receiving a request for at least one software artifact stored within a software repository of one or more software repositories of an enterprise, the request being received from a continuous delivery (CD) pipeline associated with an on-premise landscape of a customer, and comprising a user identifier, and at least one uniform resource locator (URL) indicating a location of a respective software artifact within the software repositories;
   processing the request by a repository proxy of the enterprise, the repository proxy comprising a transparent, terminating network proxy, the repository proxy configured with enterprise certificates that represent servers of the one or more software repositories, the repository proxy terminating a secure connection from the client, and responding to the client with a matching repository certificate;
   providing, by the repository proxy, an audit log entry associated with the request, the audit log entry being recorded in an audit log; and
   transmitting, by the repository proxy, a response to the request, the response comprising the software artifact retrieved from the software repositories based on the at least one URL.

10. The computer-readable storage medium of claim 9, wherein the request is provided through a secure channel, repository proxy decrypts the request using one or more repository certificates, and the repository proxy encrypts the response using the one or more repository certificates.

11. The computer-readable storage medium of claim 9, wherein the request is transmitted to the CD pipeline for delivery of the software artifact to the on-premise landscape.

12. The computer-readable storage medium of claim 9, wherein the repository proxy retrieves the software artifact from the software repository associated with the at least one URL.

13. The computer-readable storage medium of claim 9, wherein operations further comprise, prior to receiving the request:
    determining that a user associated with the user identifier is to be granted access to the software artifact stored in the software repository; and
    providing an entry in a repository access list, the entry indicating that the user is granted access to the at least one software artifact.

14. The computer-readable storage medium of claim 13, wherein the entry is provided based on a product-to-repository mapping, which maps software artifacts to respective URLs within the software repositories.

15. The computer-readable storage medium of claim 9, wherein the request is provided to a repository proxy in response to a router determining that the request has cleared an embargo check.

16. The method of claim 9, wherein any legal check, and any license check are executed by a check service, and a registration service independent from access to a software repository.

17. The system of claim 9, wherein the request is transmitted to the CD pipeline for delivery of the software artifact to the on-premise landscape.

18. The system of claim 9, wherein the repository proxy retrieves the software artifact from the software repository associated with the at least one URL.

19. A system, comprising:
    a computing device; and
    a computer-readable storage device coupled to the computing device and having instructions stored thereon which, when executed by the computing device, cause the computing device to perform operations for continuous delivery of software in on-premise landscapes, the operations comprising:
    receiving a request for at least one software artifact stored within a software repository of one or more software repositories of an enterprise, the request being received from a continuous delivery (CD) pipeline associated with an on-premise landscape of a customer, and comprising a user identifier, and at least one uniform resource locator (URL) indicating a location of a respective software artifact within the software repositories;
    processing the request by a repository proxy of the enterprise, the repository proxy comprising a transparent, terminating network proxy, the repository proxy configured with enterprise certificates that represent servers of the one or more software repositories, the repository proxy terminating a secure connection from the client, and responding to the client with a matching repository certificate;
    providing, by the repository proxy, an audit log entry associated with the request, the audit log entry being recorded in an audit log; and
    transmitting, by the repository proxy, a response to the request, the response comprising the software artifact retrieved from the software repositories based on the at least one URL.

20. The system of claim 19, wherein the request is provided through a secure channel, repository proxy decrypts the request using one or more repository certificates, and the repository proxy encrypts the response using the one or more repository certificates.

* * * * *